United States Patent [19]
Takahashi

[11] 4,268,855
[45] May 19, 1981

[54] NOISE REDUCTION SYSTEM FOR COLOR TELEVISION SIGNAL

[75] Inventor: Hiroshi Takahashi, Tokyo, Japan

[73] Assignee: Nippon Electric Co., Ltd., Tokyo, Japan

[21] Appl. No.: 55,409

[22] Filed: Jul. 3, 1979

[30] Foreign Application Priority Data

Jul. 5, 1978 [JP] Japan ............................. 53-82423

[51] Int. Cl.³ ..................... H04N 9/535; H04N 5/21
[52] U.S. Cl. .................................. 358/36; 358/167
[58] Field of Search ...................... 358/36, 31, 167

[56] References Cited

U.S. PATENT DOCUMENTS 3,715,477  2/1973  Olson et al. ........................ 358/36
4,064,530  12/1977  Kaiser et al. ..................... 358/167

Primary Examiner—John C. Martin

[57] ABSTRACT

A noise reduction system for improving the signal-to-noise ration of a television video signal includes a recursive filter including a one-frame memory, a filter for extracting a high-frequency signal component from the color television video signal, and means for clipping a low-level component of the extracted high-frequency signal component.

4 Claims, 3 Drawing Figures

NOISE REDUCTION SYSTEM FOR COLOR TELEVISION SIGNAL

This invention relates generally to a noise reduction system for improving the signal-to-noise (S/N) ratio of a color television video signal and, more particularly, to a system for improving the S/N ratio of a color television video signal by utilizing the interframe correlation of a color television video signal.

Conventional noise reduction system are disclosed, for example, in U.S. Pat. No. 4,064,530 entitled "NOISE REDUCTION SYSTEM FOR COLOR TELEVISION" issued to A. Kaiser et al. and in articles, "A Digital Noise Reducer for Encoded NTSC Signals" by R. H. McMann et al. and "Digital Techniques for Reducing Television Noise" by J. P. Rossi, published in the Journal of SMPTE, Vol. 87, March 1978 pages 129-133 and 134-140, respectively. In these disclosed systems, one to several frame portions of a video signal are recursively added to the present frame as long as there is a high interframe correlation, as, for example, when a still object is being shown. Such recursive addition serves to improve the S/N ratio. When the interframe correlation is relatively low, as when a fast moving object is being shown, either no addition is performed or fewer frame portions of the video signal are recursively added to the present frame. This is done to prevent the formation of an afterimage or lag that unavoidably accompanies recursive frame-to-frame addition for noise reduction.

Conventional noise reduction systems comprise a one-frame memory, two variable attenuators for attenuating the amplitude of present and stored video signals, an adder for adding the stored video signal to the present video signal, and means for detecting motion between the present and stored frames to produce a frame-to-frame difference signal. The variable attenuators are ganged and introduce transmission factors (1-k) and k to the present and stored video signals, respectively, with the factor k being a function of the frame-to-frame difference signal. In practice, to reduce noise contained in the television video signal while sufficiently preventing the afterimage by utilizing a recursive filter and a motion detector, a moving component portion and a stationary component portion in the video signal must be completely separated from each other, and various spatial filters are needed for the complete separation. This makes the overall noise reduction system complicated.

It is, therefore, an object of this invention to provide a noise reduction system which is less complicated than prior noise reduction systems.

According to an aspect of this invention, there is provided a noise reduction system comprising a recursive filter, which includes a one-frame memory, a comb filter for separating a luminance signal component and a chrominance signal component contained in a television video signal, and means for clipping a noise component contained in a low frequency component of the separated chrominance signal component.

According to another aspect of this invention, there is provided a noise reduction system comprising a recursive filter including a one-frame memory, a filter for extracting a high-frequency signal component from the color television video signal, and means for clipping a low-level component of the extracted high frequency signal component.

The features and advantages of this invention will be better understood from the following detailed description of preferred embodiments of this invention taken in conjunction with the accompanying drawings, wherein.

Figure 1:
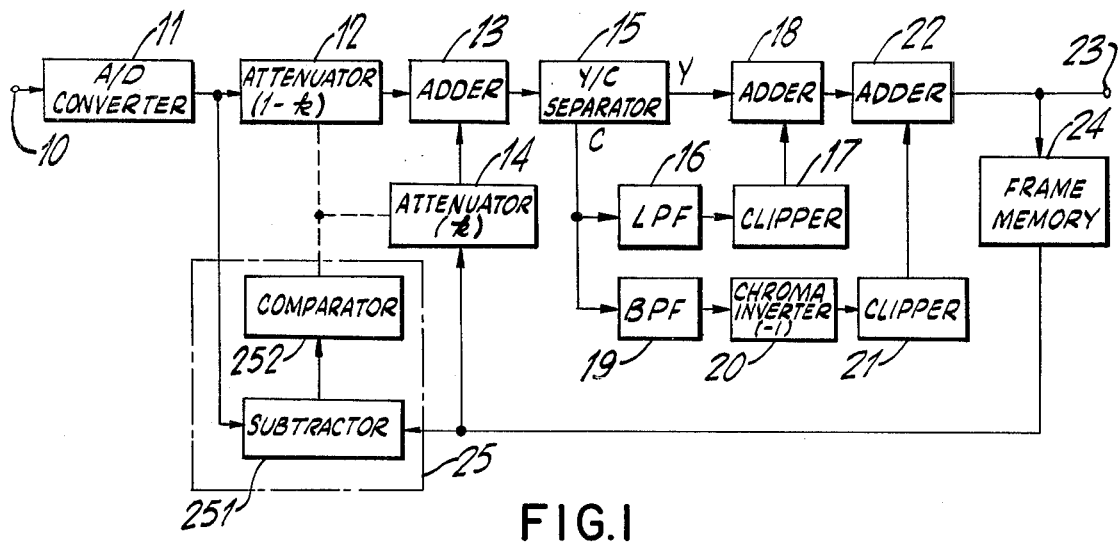
FIG. 1 is a block diagram of a noise reduction system according to a first embodiment of this invention.

Referring to FIG. 1, a video signal from an input terminal 10 is converted 11 at an analog-to-digital (A/D) converter to an 8-bit PCM signal, which is then supplied to an attenuator 12 where it is multiplied by the factor $(1-k)$. The output from the attenuator 12 is summed at an adder 13 with the output from another attenuator 14 and the summed signal is supplied to a comb filter 15 for providing a first signal A comprised of the luminance signal and a second signal B comprised of the chrominance signal component and the low-frequency signal component of the luminance signal. The comb filter 15 may be comprised of 1H delay means and adders and a subtractor, as shown in FIG. 1B of U.S. Pat. No. 3,909,839.

The second signal B is supplied to a low-pass filter 16 in which low-frequency components are extracted from the C signal. The chrominance signal of the composite color televison signal includes few low-frequency components, which means that the low-frequency components in the second signal are not chrominance signal components. In practice, however, the low-frequency components are useful for increasing the vertical resolution. For this purpose, the low-frequency components are extracted from the second signal B by the low-pass filter 16, and are supplied through a clipper circuit 17, which removes the noise components, to an adder 18, which is supplied with the first signal A and produces a compensated Y signal.

Figure 2:
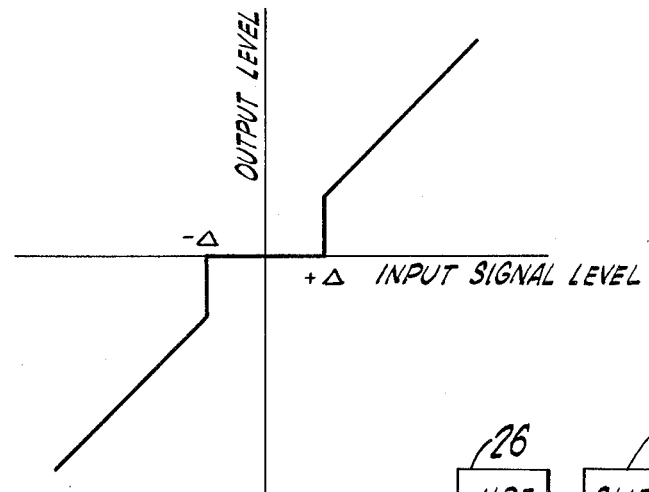
FIG. 2 shows an input level vs. output level characteristic of a clipper used in the first embodiment shown in FIG. 1.

The clipper circuit 17 removes the noise components having a level lower than that of the signal components having a higher harmonic wave of 15.75/2 KHz. Stated more specifically, the clipper circuit 17 has an input level vs. output level characteristic as shown in FIG. 2, in which the signal components having lower than a threshold level $\Delta$ in absolute value are prevented from passing through. The threshold level $\Delta$ is selected to $2 \sim 3$ percent of the maximum level of the signal. The signal components higher than the threshold level $\Delta$ in absolute value are passed through the clipper circuit without undergoing any attenuation. It is noted that if the signal components higher than the threshold level are amplified, the vertical resolution is improved.

The second signal B from the comb filter 15 is also supplied to a band-pass filter 19 having a pass band of about 3.58 MHz$\pm$1 MHz to extract a pure chrominance (C) component, which is supplied to a chroma inverter 20. In the NTSC system, phases of the subcarrier waves in the adjacent frames are different from each other by 180°. The chroma inverter 20 is provided for bringing the subcarrier phases into coincidence between two adjacent frames. The chroma-inverted chrominance (C) signal is supplied through a clipper circuit 21 having a threshold level lower than the threshold level $\Delta$ of the clipper circuit 17 to an adder 22, which is supplied with the Y signal from the adder 18 and produces the composite signal. The composite video signal from the adder 22 is supplied through a terminal 23 to a digitalto-analog (D/A) converter (not shown), where it is converted to an analog signal.

The composite video signal from the adder 22 is also supplied to a one-frame memory 24, which has a capacity for one frame portion of the video signal. The stored video signal in the frame memory 24 is supplied to the attenuator 14, which multiplies the input by the factor k and supplies the output to the adder 13. In other words, the stored video signal is recursively added to the present video signal. The recursive addition serves to improve the S/N ratio of the color television video signal. If the factor k is set approximately at ½, the time constant of the recursive filter comprising the frame memory 24 is less than 0.05 second, and the afterimage is practically prevented.

In the above construction, when the threshold level Δ is selected to be 2~3 percent of the maximum level, the clipper circuits serve to improve the S/N ratio by about 3 dB. Further, setting the factor k at ½ serves to improve the S/N ratio by 4~5 dB. This makes it possible to totally improve the S/N ratio by 7~8 dB.

The embodiment of the invention illustrated in FIG. 1 further comprises a motion detector 25 composed of a subtractor 251 and a comparator 252. The subtractor 251 delivers a signal representative of the frame-to-frame difference between the incoming, i.e., present, and the stored video signals supplied from the A/D converter 11 and the frame memory 24 thereto, respectively. The frame-to-frame difference signal from the subtractor 251 is supplied to the comparator 252, which compares the frame-to-frame difference signal with reference levels and produces a control signal for controlling the factor k in response to the frame-to-frame difference signal. More specifically, the factor k is selected to be 0, ¼, ½, and ¾ when the absolute value of the difference signal is in the highest-level range, second-highest-level range, second-lowest-level range, and lowest-level range (including 0), respectively. This means that it is possible to increase the factor k to ¾ when the stationary portion is detected at the motion detector 25, and to further improve the S/N ratio by 4 dB, whereby a total improvement in the S/N ratio of 11~12 dB can be obtained.

Figure 3:
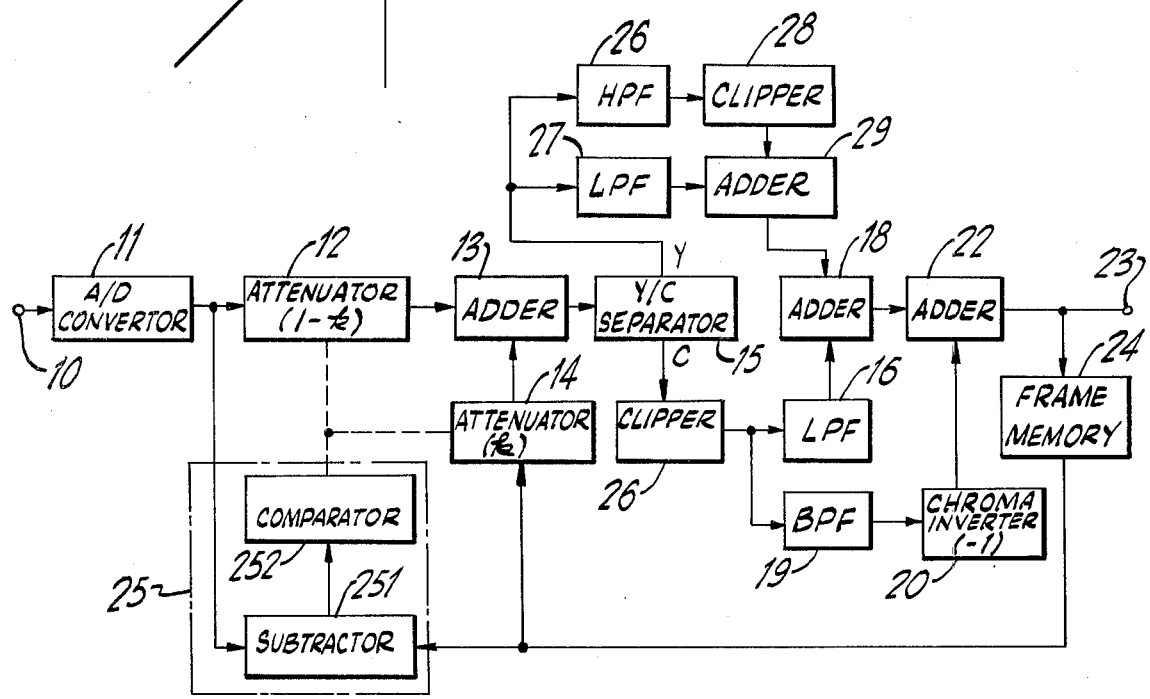
FIG. 3 is a block diagram of a noise reduction system according to a second embodiment of this invention.

The embodiment of the invention illustrated in FIG. 3 comprises a single clipper circuit 26 provided between the Y/C separator 15 and the filters 16 and 19 instead of the clipper circuits 17 and 21 employed in the embodiment shown in FIG. 1. The clipper circuit 26 may be identical to the clipper circuit 16, in which the threshold level Δ is determined to be 2~3 percent of the maximum signal level.

The embodiment of FIG. 3 further comprises high-pass and low-pass filters 26 and 27, respectively, having a cut-off frequency of about 1.5 MHz, which are supplied with the Y signal from the Y/C separator 15. The high-frequency component of the Y signal is supplied from the high-pass filter 26 to a clipper circuit 28 for removing the noise components contained in the Y signal. In the clipper circuit 28, the threshold level Δ is determined to be 2~3 percent of the maximum value of the Y signal level. The output from the clipper circuit 28 is supplied to an adder 29 where it is added to the low-frequency component of the Y signal supplied from the low-pass filter 27. The output from the adder 29 is supplied to the adder 18 where it is added to the low frequency component of the second signal B supplied from the low-pass filter 16 to produce the compensated Y signal. The output of the chroma inverter 20 is applied to one input of adder 22 where it is added to the output of adder 18. As in the embodiment of FIG. 1, the output of adder 22 is applied to terminal 23 and to frame memory 24. The clipping of the high frequency component of the Y signal by the clipper circuit 28 makes it possible to further improve the S/N ratio by 1~2 dB.

In the noise reduction system according to this invention, the factor k in the recursive filter is maintained at the relatively low level to prevent the occurrence of afterimages, and the clipping process compensates the S/N ratio deterioration resulting in the low factor k.

What is claimed is:

1. A noise reduction system for reducing noise contained in a television video signal, said system comprising:

memory means for storing the video signal for a period substantially equal to the period of one television frame to produce a stored video signal;

means for recursively adding said stored video signal to a present video signal to produce an added signal;

a comb filter coupled to said adding means and responsive to said added signal for providing a first signal comprised of a luminance signal and a second signal comprised of a chrominance signal and low-frequency components of the luminance signal;

first means coupled to said comb filter and responsive to said second signal for clipping low-level components of said second signal, said first means including second means for clipping low-level components of a high-frequency component included in said second signal; and means for adding an output of said first means to said first signal.

2. The noise reduction system as claimed in claim 1, wherein said first means further includes third means for clipping low-level components of the low-frequency component included in said second signal.

3. The noise reduction system as claimed in claim 1, wherein said first means includes a first filter for extracting the high-frequency component of said second signal; a first clipper for clipping low-level components of said high-frequency component; a second filter for extracting the low-frequency component of said second signal; and a second clipper for clipping low-level components of said low-frequency component.

4. The noise reduction system as claimed in claim 1, wherein said first means includes a clipper for clipping low-level components of said second signal; and first and second filters coupled to said clipper for extracting high and low-frequency components of said second signal.

* * * * *